Figure 1:
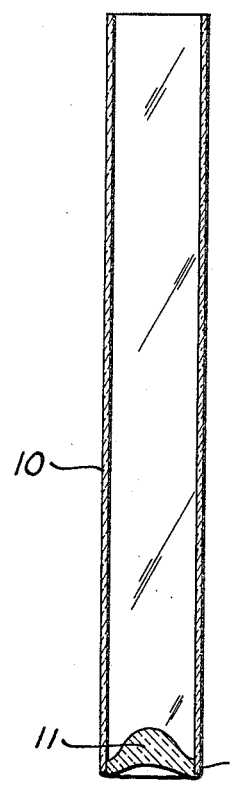

Dec. 25, 1962

R. P. JAMES ETAL 3,070,540

GLASS ELECTRODE

Filed Feb. 8, 1960

INVENTORS
RICHARD PAUL JAMES,
ROBERT WILLIAM NOLAN
BY THEIR ATTORNEYS
HARRIS, KIECH, RUSSELL & KERN

3,070,540
GLASS ELECTRODE
Richard Paul James, Brea, and Robert William Nolan, Altadena, Calif., assignors to Beckman Instruments, Inc., a corporation of California
Filed Feb. 8, 1960, Ser. No. 7,155
8 Claims. (Cl. 204—195)

This invention relates to glass electrodes suitable for use in pH measurements and the like and to a method for their manufacture.

Glass electrodes are widely used and ordinarily comprise a thin bulb of low resistance electrode glass blown on or otherwise fixed to the end of a glass supporting tube having a high electric resistance. The characteristics of the electrode are a function of the particular glass of which the bulb is formed and of the electric resistance of the resultant bulb. The electric resistance is a function of, among other things, the thickness of the glass of the bulb and in order to achieve desirable low resistances, the bulbs are often formed of very thin glass membranes which are very fragile. It is an object of the present invention to provide a new form of glass electrode having the desired low electric resistance and also having a much improved mechanical strength. Another object is to provide a new form of electrode that will have a relatively small outside diameter while providing the desired low electric resistance. A more specific object is to provide a strong, low resistance electrode that may be directly substituted for existing electrodes and that can be manufactured in a size to pass through a one-half inch diameter opening.

It is an object of the invention to provide a glass electrode having a generally tubular bulb or membrane with one or more annular corrugations in the wall thereof. A further object is to provide a glass electrode having a tubular body of high resistance and a thin glass membrane carried at the end of the body with the membrane comprising a first bulb sealed at its open top to the end of the body and sealed at its open bottom to the open top of a second bulb with the diameter of the seal zone between the bulbs being less than the maximum diameters of each of the respective bulbs.

A further object of the invention is to provide a new form of glass electrode that can be manufactured by blowing techniques and by glass molding and spinning techniques. It is an object to provide a new method of making a glass electrode wherein a gob of molten glass is taken up on a tube of another kind of glass, a first bulb is formed from the gob at the end of the tube with the first bulb having a relatively thin side wall and a relatively thick bottom, and then a second bulb is formed from the bottom of the first bulb and continuous therewith. Another object of the invention is to provide such a method that may be used to produce electrodes with three or more bulbs therein.

The invention also comprises novel details of design and manufacture which will more fully appear in the course of the following description. The drawing merely shows and the description merely describes preferred embodiments of the present invention which are given by way of illustration or example.

Figure 3:
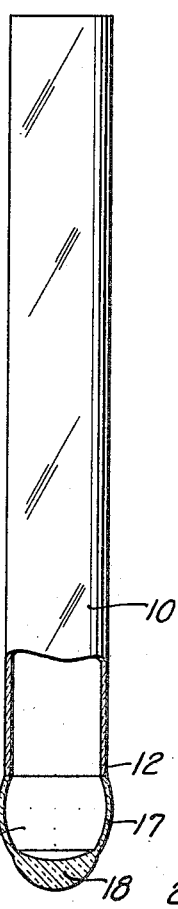
Figure 4:
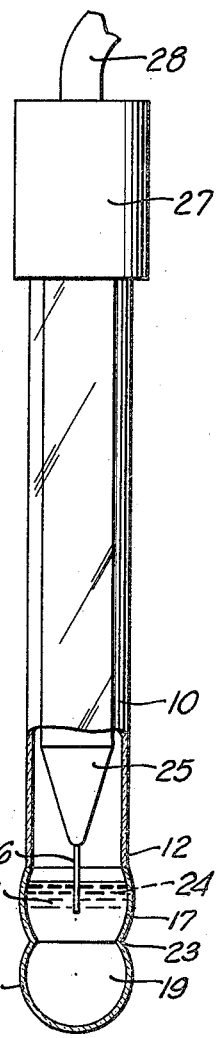
Figure 5:
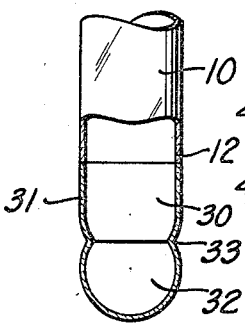
Figure 6:
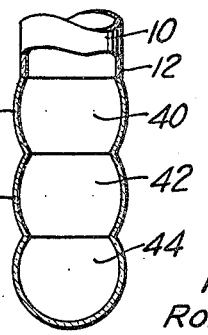

In the drawing:
FIGS. 1 through 4 show progressive steps in the preferred method of manufacture of the glass electrode;
FIG. 5 shows an alternative form of the finished electrode; and
FIG. 6 shows another form of the finished electrode.

FIG. 1 shows a conventional stem or body tube 10 of glass having a high electrical resistance. A gob 11 of molten glass of which the membrane is to be formed is taken up into the tube 10. This may be accomplished by positioning the lower end 12 of the tube at or slightly into the surface of a body of molten glass and applying a vacuum to the tube to draw the gob of glass into the end of the tube. A typical furnace and glass melt suitable for use with the present invention are shown in the U.S. patent to Cary and Baxter, 2,346,470. The tube is maintained in contact with the molten body of glass for a period of time sufficient to wet the entire periphery of the end and provide a seal between the end and the gob of glass taken up by the tube. Preferably the end of the tube is preheated to improve the seal and reduce the possibility of cracking when the tube contacts the molten mass. The gob of glass which is drawn into the tube is a considerably greater quantity than can be picked up by surface tension and viscosity effects when the end of a tube is merely inserted into and removed from a melt.

Figure 2:
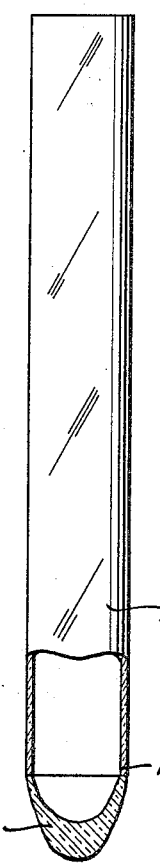

The body tube 10 with the molten gob 11 at the lower end thereof is maintained in a vertical position after removal from the furnace. The force due to gravity acting on the molten gob will cause it to move downward relative to the body, forming a cuplike structure, as seen in FIG. 2. The cuplike structure will continue to elongate forming a thin side wall 13, until the side wall cools and becomes rigid resulting in a first bulb sealed to the end of the body. A slight amount of blowing pressure may be applied to the body 10 while the gob is being elongated by the force of gravity, resulting in a globular or spherical bulb 16, as seen in FIG. 3. This bulb has a relatively thin side wall 17 and a relatively thick bottom 18 with the upper end of the side wall joined to the end 12 of the body in sealing relation. After the side wall has hardened and while the bottom is still soft, the glass which formed the bottom is blown into a second bulb 19, which is ordinarily globular or spherical in shape. The side wall 17 of the upper bulb is joined at its bottom to the top of the side wall 20 of the lower bulb, with the respective bottom and top being of lesser diameter than the maximum diameter of the corresponding bulb, resulting in an annular corrugation or pinched-in zone 23 between the upper and lower bulbs.

This glass electrode with the corrugated membrane may be used in the same manner as conventional glass electrodes. A typical application for use with a pH meter is shown in FIG. 4 wherein the lower end of the glass electrode is filled with an electrolyte 24 and a rod 25 carrying a silver-silver chloride electrode 26 is positioned in the body tube 10 with the electrode 26 dipping into the electrolyte 24. The rod 25 is sealed in the body by means of a cap 27 and a cable 28 provides an electrical connection between the electrode 26 and the measuring equipment.

The particular shape of the bulbs is not significant and they may be spherical, cylindrical or other suitable forms. An alternative shape produced by a slight variation in the previously described method is shown in FIG. 5. In this process, no air pressure is applied to the unit while the molten gob is being drawn downward into the cuplike structure as shown in FIG. 2. The force due to gravity alone will produce a bulb 30 having a substantially cylindrical side wall 31. After the relatively thin side wall 31 has hardened and the relatively thick bottom is still soft, a second bulb 32 is blown from the soft bottom material as in the earlier described method. As with the earlier method, an annular corrugation 33 is produced at the junction of the upper and lower bulbs, the bottom edge of the cylindrical wall 31 being of a lesser diameter than the main portion of the wall, and the upper edge of the lower bulb being of a lesser diameter than the maximum diameter of the bulb. The particular working temperature, timing, and amount of pressure will vary for each type of glass and each size of body tube, however, these factors may be readily determined with a few trials as is conventional in glass working. While it is not necessary, it is preferred to have the walls of the upper and lower bulbs of substantially the same thickness and this is readily accomplished by an experienced glass worker.

An electrode with a multiply corrugated membrane is shown in FIG. 6. This electrode may be formed in the same manner as those of FIGS. 4 and 5. A molten gob of glass is drawn into the lower end 12 of the tube 10. On removal from the melt, the gob sags downward and, with a slight amount of internal pressure if desired, forms a first bulb 40 with a relatively thin side wall 41. This thin side wall hardens rapidly. Then while the thicker mass of glass at the lower end of the bulb is still soft, a second bulb 42 is blown. However, blowing of the second bulb is stopped while the bottom is thicker than the side wall 43 and, after the side wall hardens, a third bulb 44 is blown from the bottom material of the second bulb.

The corrugated glass membrane comprising a plurality of bulbs supported seriatim from a high resistance stem and dependent from one another results in a glass electrode having a number of significant improvements over the conventional glass electrode. Many applications of glass electrodes require a large surface area for the membrane and also a very thin membrane. The conventional, large spherical, single bulb, while functioning well in the measuring system, is extremely fragile and must be handled with great care. The present glass electrode provides the desirable large area and low electrical resistance while simultaneously providing a many fold increase in mechanical strength. Also, for the same surface area, a much smaller maximum diameter is obtained, permitting use of the glass electrode in locations not previously available. It should also be noted that the glass electrode of the present invention can be formed in a single blowing operation without requiring reheating or reworking while producing a homogeneous membrane securely sealed to the supporting body tube.

The following test data illustrates the marked superiority of the corrugated multiple bulb membranes of the present invention over the conventional single spherical bulb membrane. Using the same stems, membrane glass, furnace and operator, sixteen glass electrodes with spherical bulbs and twenty glass electrodes with single corrugated bulbs were produced. The stems had an outside diameter of twelve millimeters. The corrugated bulbs had a diameter of fifteen millimeters plus or minus one millimeter. The spherical bulbs had a diameter of fifteen millimeters plus or minus one millimeter. The resistance of each bulb was measured, the spherical bulbs ranging from 0.7 to 3.0 megohms and the corrugated bulbs from 1.6 to 2.9 megohms. The mechanical strength of each bulb was determined by slowly applying a force to the end of the electrode and noting the magnitude when the bulb fractured. Some of the spherical bulbs were broken with two pounds force and the maximum force required was thirty pounds, with half the bulbs being broken at less than ten pounds. In contrast, the minimum breaking force for the corrugated bulbs was thirty-five pounds with three bulbs not breaking at one hundred pounds, while over half the bulbs withstood a force of sixty pounds.

It should be noted that the corrugated bulb glass electrode can be produced by techniques other than that described above, such as by molding and by spinning.

Although exemplary embodiments of the invention have been disclosed and discussed, it will be understood that other applications of the invention are possible and that the embodiments disclosed may be subject to various changes, modifications and substitutions without necessarily departing from the spirit of the invention.

We claim as our invention:

1. In a glass electrode, the combination of: a tubular body of relatively high resistance glass and having an open end; a first bulb of ion sensitive glass and having a side wall with an open top and an open bottom, with said first bulb sealed to said end of said body at the top of said side wall, and with said open bottom of a diameter less than the maximum diameter of said first bulb; a second bulb of ion sensitive glass and having a side wall with an open top and a closed bottom, with said open top of a diameter less than the maximum diameter of said second bulb, and with said side wall of said second bulb dependent from said side wall of said first bulb and sealed thereto with the top of said second bulb and the bottom of said first bulb abutting, closing said open end of said body; an electrolyte within said bulb; and conductor means carried within said body and contacting said electrolyte.

2. In a glass electrode, the combination of: a tubular body of relatively high resistance glass and having an open end; a plurality of bulbs of ion sensitive glass and joined seriatim at their respective tops and bottoms at zones of lesser diameter to form a corrugated container, with the top of the uppermost bulb sealed to said end of said body; an electrolyte within said bulb; and conductor means carried within said body and contacting said electrolyte.

3. In a glass electrode, the combination of: a tubular body of relatively high resistance glass and having an open end; a first bulb of ion sensitive glass and having a side wall with an open top and an open bottom, with said first bulb sealed to said end of said body at the top of said side wall, and with said open bottom of a diameter less than the maximum diameter of said first bulb; a second bulb of ion sensitive glass and having a side wall with an open top and a closed bottom, with said open top of a diameter less than the maximum diameter of said second bulb, with said bulbs made of the same glass and with said side walls of substantially the same thickness, and with said side wall of said second bulb dependent from said side wall of said first bulb and sealed thereto with the top of said second bulb and the bottom of said first bulb abutting, closing said open end of said body; an electrolyte within said bulb; and conductor means carried within said body and contacting said electrolyte.

4. In a glass electrode, the combination of: a tubular body of relatively high resistance glass and having an open end; a first bulb of ion sensitive glass and having a substantially cylindrical side wall and sealed to said end of said body at the top of said side wall, and having a turned-in bottom rim; a substantially spherical second bulb of ion sensitive glass and having a top opening sealed to said bottom rim of said first bulb forming a closed structure for said end; an electrolyte within said bulb; and conductor means carried within said body and contacting said electrolyte.

5. In a glass electrode, the combination of: a tubular body of relatively high resistance glass and having an open end; a first bulb of ion sensitive glass and having an open top and an open bottom and sealed to said end of said body adjacent said open top; a second bulb of ion sensitive glass and having an open top and an open bottom and joined to said first bulb with said first open bottom and second open top abutting; a third bulb of ion sensitive glass and having an open top and joined to said second bulb with said second open bottom and third open top abutting; an electrolyte within said bulb; and conductor means carried within said body and contacting said electrolyte.

6. In a shell for a glass electrode, the combination of: a first tubular member of relatively high resistance glass; and a second tubular member of ion sensitive glass, with said members joined end-to-end and with the other end of said second member closed, and with said second member having at least one annular corrugation in the wall thereof.

7. In a glass electrode, the combination of: a tubular body of relatively high resistance glass and having an open end; a first bulb of ion sensitive glass and having a side wall with an open top and an open bottom, with said first bulb sealed to said end of said body at the top of said side wall, and with said open bottom of a diameter less than the maximum diameter of said first bulb; a second bulb of ion sensitive glass and having a side wall with an open top, with said open top of a diameter less than the maximum diameter of said second bulb, and with said side wall of said second bulb dependent from said side wall of said first bulb and sealed thereto with the top of said second bulb and the bottom of said first bulb abutting; an electrolyte within said bulb; and conductor means carried within said body and contacting said electrolyte.

8. A shell for a glass electrode having a relatively high resistance tubular glass body and a bulbous membrane made of an ion sensitive glass sealed to an end of said body, said body and said membrane together defining a continuous enclosure, with the bulbous membrane having at least one inwardly extending corrugation substantially parallel to and remote from the seal formed between the body and the bulbous membrane.

References Cited in the file of this patent

UNITED STATES PATENTS

| | | |
|---|---|---|
| 1,110,985 | Bastian | Sept. 15, 1914 |
| 1,903,495 | Beck | Apr. 11, 1933 |
| 2,201,659 | Young | May 21, 1940 |
| 2,340,642 | Cameron | Feb. 1, 1944 |
| 2,346,470 | Carey et al. | Apr. 11, 1944 |
| 2,595,077 | Hughes et al. | Apr. 29, 1952 |
| 2,641,724 | Tice | June 9, 1953 |
| 2,683,333 | Canicoba | July 13, 1954 |
| 2,756,203 | Gilbert | July 24, 1956 |
| 2,857,714 | Bol Raap | Oct. 28, 1958 |

OTHER REFERENCES

Beckman Instruments, "Bulletin 86–K" page 10.